United States Patent
Pfirrmann et al.

(10) Patent No.: US 6,913,729 B2
(45) Date of Patent: Jul. 5, 2005

(54) LARGE BLOW MOLDINGS MADE FROM POLYETHYLENE

(75) Inventors: Günther Pfirrmann, Ludwigshafen (DE); Dieter Lilge, Limburgerhof (DE); Günter Hatzmann, Leimen (DE); Dieter Boes, Wiesloch (DE)

(73) Assignee: Elenac GmbH, Kehl (DE)

( * ) Notice: Subject to any disclaimer, the term of this patent is extended or adjusted under 35 U.S.C. 154(b) by 390 days.

(21) Appl. No.: 10/035,103

(22) Filed: Jan. 3, 2002

(65) Prior Publication Data

US 2004/0131807 A1 Jul. 8, 2004

Related U.S. Application Data

(62) Division of application No. 09/303,600, filed on May 3, 1999, now abandoned.

(51) Int. Cl.[7] .......................... B65D 90/02; B65D 88/12
(52) U.S. Cl. ....................... 264/519; 264/539; 428/35.7
(58) Field of Search ................................. 264/519, 539; 428/35.7

(56) References Cited

U.S. PATENT DOCUMENTS

| | | | |
|---|---|---|---|
| 6,244,454 B1 | * | 6/2001 | Yoshioka et al. ......... 220/62.22 |
| 6,391,412 B1 | * | 5/2002 | Hata et al. .................. 428/36.7 |
| 2001/0009242 | * | 7/2001 | Czesak et al. ................. 215/44 |

* cited by examiner

*Primary Examiner*—Sandra M. Nolan
(74) *Attorney, Agent, or Firm*—Novak Druce & Quigg, LLP

(57) ABSTRACT

Large blow moldings are made from polyethylene of density $\rho \geq 0.94$ g/cm$^3$ and of melt flow rate MFR 190/21.6<50 g/10 min, and of notched tensile impact strength $a_{zK}$ (−30° C.) not less than 300 kJ/m$^2$ and bursting strength, determined by a drop height test at −18° C., of more than 3 m. Processes for producing large blow moldings of this type involve annealing large blow moldings after production. The moldings are used for storage and transport of hazardous materials.

3 Claims, No Drawings

LARGE BLOW MOLDINGS MADE FROM POLYETHYLENE

This is a divisional application of Ser. No. 09/303,600, filed on May 3, 1999, now abandoned.

The present invention relates to large blow moldings, in particular canisters, tanks, drums and intermediate bulk containers, made from polyethylene of density $\rho \geq 0.94$ g/cm$^3$ and of melt flow rate MFR 190/21.6<50 g/10 min, and notched tensile impact strength $a_{zK}$ (−30° C.), measured in accordance with ISO 8256, of not less than 300 kJ/m$^2$ and bursting strength, determined by a drop height test at −18° C., of more than 3 m. It also relates to a process for producing large blow moldings of this type by annealing large blow moldings after production, and to their use for storage and transport of hazardous materials.

In principle, large blow moldings made from polyethylene are known. In particular canisters, tanks, drums and intermediate bulk containers (IBC) made from polyethylene are used for storage and transport of all types of liquids and solids. Particular requirements are placed upon large blow moldings for storage and transport of hazardous materials, e.g. of highly flammable, corrosive or toxic liquids. Besides good resistance to chemicals, large blow moldings of this type must also have high stiffness so that they can, for example, easily be stacked. In addition, they must have good impact resistance and breaking strength, so that they do not leak or break even if an accident occurs in transportation, e.g. a fall from the loading area of a truck. Large blow moldings made from polyethylene with good stiffness and good impact resistance and breaking strength for storage and transport of hazardous materials are usually composed of high-molecular-weight HDPE with high impact strength.

However, the properties of the polyethylene give only a limited indication of the properties of a finished polyethylene part made from the same, since the conditions under which the polyethylene is processed to give the finished part affect its properties to a greater or lesser extent. For example, in injection molding or blow molding molecular orientations and stresses can easily arise. This is described, for example in Kunststoffhandbuch, Vol. IV, Polyolefine, Ed.: R. Vieweg, Carl-Hanser-Verlag, Munich, 1969, pp. 335–337. Tests of the finished part are therefore very important. The breaking strength of containers approved for transporting hazardous materials is therefore tested using a drop test. In this, the containers are filled with a test liquid and allowed to fall onto a rigid substrate at −18° C. The test specifications require them to withstand a fall from a height of from 0.8 to 2.9 m, depending on the density of the fill and the hazard which it represents, without any leak arising (Richtlinien über das Verfahren für die Durchführung der Bauartprüfung und die zulassung von Verpackungen Für die Beförderung gefährlicher Güter, Appendix V issued by the German Transport Ministry on Jun. 28, 1995). However, the market requires containers with further improved properties, so as to increase transport safety. There is a demand for containers with a bursting strength height of more than 3 m and with further increased stiffness.

It is known that the stiffness and the density of plastics increase as the degree of crystallization increases, and that the degree of crystallization can be improved by posttreatment with heat. However, this treatment can also cause embrittlement of the molding (see, for example, Saechtling, Kunststoffhandbuch, pp. 93/94, Carl-Hanser-Verlag, Munich, Vienna, 1995).

In principle, the annealing of small blow moldings made from polyethylene is known. U.S. Pat. No. 3,317,642 has disclosed the annealing of polyethylene milk bottles at from 93.3 to 96.1° C. This achieved a constant bottle volume which does not change further as the period of use increases. U.S. Pat. No. 3,293,341 and U.S. Pat. No. 3,544,673 disclose the annealing of bottles to increase stiffness. R. S. Schotland et al. (Poly. Prep., Am. Chem. Soc., Div. Pol. Sci. (1968), 9(2), 1219–1226) disclose the annealing of blow-molded bottles made from HDPE for from 4 to 15 min at from 122 to 127° C., giving an improvement in stiffness and stress-cracking resistance (ESCR) and stable volume. Fleißner (Angew. Makromol. Chem. 105 (1982) 167) discloses the increasing of density and toughness of standard polyethylene test specimens by annealing at from 85 to 131° C.

None of the disclosures mentioned, however, includes the improvement of the breaking strength of large blow moldings, i.e. blow moldings with a volume of more than 5 l. The kinetic energy in a fall of large blow moldings filled with liquids or solids is much greater than when small blow moldings fall, and the requirements placed upon large blow moldings are therefore significantly higher. In particular, none of the disclosures includes large blow moldings made from polyethylene with significantly improved breaking strength which also withstand a fall from at least 3 m under the test conditions without damage and which can be used for storage and transport of hazardous materials. It is an object of the present invention to provide large blow moldings of this type.

We have found that this object is achieved by means of the large blow moldings defined at the outset, made from polyethylene. The invention further provides a process for producing large blow moldings of this type, and also their use for the storage and transport of hazardous materials.

For the purposes of this invention the large blow moldings have a volume of from 5 to 5,000 l, preferably from 10 to 1,500 l and very preferably from 30 to 250 l. The large blow moldings are preferably canisters, tanks, drums or intermediate bulk containers (IBC). Examples of novel large blow moldings are 30–220 liter wide-necked drums, 120 and 220 liter tight-head and L-ring drums, canisters up to 60 liters, storage containers, transport containers and tanks holding from 600 to 5,000 liters. The large blow moldings are composed of polyethylene. For the purposes of this invention, the term polyethylene includes both ethylene homopolymers and ethylene copolymers, which may also comprise, beside ethylene, relatively small amounts of comonomers. The content of comonomers should preferably not exceed 1 mol % of the total amount of monomers used. Preferred comonomers are 1-olefins, and particularly preferred comonomers are 1-butene, 1-hexene and 1-octene. The polyethylene may also be a blend made from two or more polyethylene components. For the purposes of this invention, the polyethylene may moreover comprise small amounts of conventional additives and auxiliaries, such as stabilizers to prevent degradation during processing or to prevent thermal oxidation, ageing or the effects of UV, or also dyes, or organic or inorganic pigments, waxes or specific low-molecular-weight lubricants. The amount of additives and auxiliaries should not, however, exceed 1% by weight, preferably 0.5% by weight, based on the total amount of material. The density of the polyethylene is at least 0.94 g/cm$^3$. If the density is lower then the stiffness achieved is no longer sufficient. The density is preferably greater than 0.95 g/cm$^3$. The melt flow rate MFR 190/21.6 of the polyethylene is from 0.5 to 50 g/10 min. If the melt flow rate of the polyethylene is lower than 0.5 g/10 min, the polymer does not generally have sufficient processability, and if the melt flow rate>50 g/10 min, the impact strength achieved is not sufficient. The melt flow rate MFR 190/21.6 is preferably from 1 to 30 g/10 min, very particularly preferably from 1 to 10 g/10 min. The polyethylene preferably has a weight-average molar mass of from 200 to 800 kg/mol and polydispersity $M_w/M_n$ of from 5 to 80.

The novel large blow moldings have particularly high impact strength. The notched tensile impact strength $a_{zK}$, measured in accordance with ISO 8256 at −30° on test specimens cut out from the blow molding, is not less than 300 kJ/m². If the notched tensile impact strength is lower, the large blow molding has insufficient impact strength. The novel large blow moldings also have particularly high bursting strength. The bursting strength is determined using a drop test. The test specification is given in the guidelines cited at the outset, issued by the German Transport Ministry on Jun. 28, 1995. For the test the large blow moldings are filled with a test liquid made from water and ethylene glycol (density 1.1 g/cm³), cooled to −18° C., and allowed to fall onto a rigid, non-cushioning substrate. They withstand a fall from a height of at least 3 m without any leak arising.

The novel large blow moldings may be produced by using polyethylene of density $\rho \geq 0.94$ g/cm³ and of a melt flow rate MFR 190/21.6<50 g/10 min and notched tensile impact strength $a_{zK}$ (measured at −30° C. on a test specimen of PE) not less than 250 kJ/m², and forming the same at high temperatures to give a large blow molding. The polyethylene used preferably has a weight-average molar mass of from 200 to 800 kg/mol and a polydispersity $M_w/M_n$ of from 5 to 80.

The large blow moldings may be formed by processes known per se, such as extrusion blow molding, or combined processes in which, for example, injection-molded lids are welded onto blow-molded or extruded sections. Extrusion blow molding is the preferred process method for the forming and is described in detail, for example, in Blow Molding Handbook, ed. D. V. Rosato, Carl-Hanser-Verlag, Munich, 1989. The shape and size of the large blow moldings depend on the respective application. The wall thickness likewise depends on the application, but is preferably not more than 10 mm, very particularly preferably from 1 to 5 mm. A particular embodiment for transport of hazardous materials is the L-ring drum, described in DE 37 32 898. The processing temperature depends on the requirements of the polymer selected and of the forming process. After forming, the large blow moldings are cooled to room temperature. The raw blow moldings may also be stored in this condition for a prolonged period. Their drop height is not yet sufficient: less than 3 m. In a second step the large blow moldings are annealed at from 60 to 135° C., preferably from 80 to 120° C. The blow molding may be heated to the annealing temperature in any desired manner, the important factor being merely that:the heating is uniform. It may, for example, be annealed in a circulating-air drying cabinet. In the course of the annealing the notched tensile impact strength $a_{zK}$ (−30° C.) increases significantly. The duration of the annealing depends on the notched tensile impact strength $a_{zK}$ (−30° C.) desired. It is terminated only when the $a_{zK}$ has reached a level of at least 300 kJ/m². The blow molding is then cooled again to room temperature. Surprisingly, it has been found that the drop height of large blow moldings made from polyethylene and treated in this way increases very significantly in the course of this annealing treatment, by a factor of up to more than 3. The required minimum drop height of 3 m may be significantly exceeded. Another advantage of the process is that variations in quality between different production batches of large blow moldings can be compensated, and a relatively uniform level of drop height can be achieved.

The impact strength and bursting strength of the large blow moldings produced in this way far exceed the requirements of specifications for the transport of hazardous materials, and the moldings therefore have excellent suitability for storage and transport of hazardous materials.

The following examples serve to describe the invention further, but do not limit its scope.

The properties described were measured in the following manner:

| | |
|---|---|
| Density: | in accordance with ISO 1183 |
| melt flow rate: | |
| MFR 190/21.6: | in accordance with ISO 1133 |
| Staudinger index $J_g$: | in accordance with ISO 1628 |
| $M_w$ and $M_w/M_n$ | by gel permeation chromatography (GPC) |
| Notched tensile impact strength $a_{zk}$: | measured at −30° C. in accordance with ISO 8256. Test specimens of dimensions 80 × 10 × 4 mm produced in accordance with ISO 1872-2, compression-molded from prehomogenized granules or pellets in the case of PE starting material or in the case of the large blow moldings cut out from the wall. |
| Drop height: | determined in accordance with the guidelines cited at the outset and issued by the German Transport Ministry on Jun. 28, 1995. The drums were 98% filled with a mixture of water and ethylene glycol, cooled to −18° C., and dropped from various heights in accordance with the specifications. The absence of leakage from the drums after falling was tested in accordance with the test specification, using a pressure of 0.2 bar. The drop heights given are in each case the greatest heights from which a drum could be dropped without a leak arising. |

EXPERIMENT 1

A 220 liter L-ring drum was formed (described in DE 37 32 898) from polyethylene of density 0.953 g/cm³ and with melt flow rate MFR 190/21.6 of 2 and notched tensile impact strength ($a_{zK}$ at −30° C.) 280 kJ/m², by extrusion blow molding, and cooled. The drop height (~18° C.) of this drum was 1.2 m and its $a_{zK}$ (−30° C.) was 296 kJ/m². Further data are given in the table. The resultant L-ring drum was annealed for 16 h at 110° C. Its $a_{zK}$ (−30° C.) improved to 341 kJ/m², and the drop height improved to 4 m.

EXPERIMENT 2

The procedure was as in Experiment 1 except that the polyethylene used to produce the drums comprised an optimized phosphite stabilizer as described in EP-B 600 368. The drop height test gave a drop height of 4.5 m.

EXPERIMENT 3

The procedure was as in Experiment 1 except that the polyethylene used had a tensile impact strength $a_{zK}$ (−30° C.) of 250 kJ/m². The drop height test (−18° C.) gave a drop height of 5.9 m.

Table 1 gives the data obtained from the measurements. It shows the particularly good drop heights and the particularly good tensile impact strength of the novel large blow moldings.

TABLE

Properties of the large blow moldings before and after annealing

| Experiment No. | Polymer | Annealing | | Drop height at −18° C. [m] | | $a_{zk}$ at −30° C. [kJ/m²] | | Density [g/cm³] | | Melt-flow ratio MFR 190/21.6 [g/10 min] | | $J_g$ [cm³/g] | |
|---|---|---|---|---|---|---|---|---|---|---|---|---|---|
| | | T [° C.] | Duration [h] | before | after | before | after | before | after | before | after | before | after |
| 1 | A | 110 | 16 | 1.2 | 4 | 296 | 341 | 0.950 | 0.954 | 1.8 | 1.8 | 480 | 491 |
| 2 | A | 110 | 16 | 1.5 | 4.5 | 276 | 343 | 0.950 | 0.954 | 1.8 | 1.8 | 483 | 488 |
| 3 | B | 110 | 16 | 2.1 | 5.9 | 278 | 332 | 0.949 | 0.954 | 1.4 | 1.4 | 436 | 449 |

We claim:

1. A process for producing a large polyethylene blow molding having a volume of from 5 to 5,000 l and having a bursting strength determined by a drop height test at −18° C. of more than 3 m, by forming polyethylene having a density $\rho \geq 0.94$ g/cm³, a melt flow rate MFR 190/21.6<50 g/10 min and a notched tensile impact strength $a_{zK}$ (−30° C.) not less than 250 kJ/m², at high temperatures to give a large blow molding having a volume of from 5 to 5,000 l, and allowing the blow molding to cool to room temperature, and, in a further step, annealing the blow molding at from 60 to 135° C. until the notched tensile impact strength $a_{zK}$ (−30° C.), measured in accordance with ISO 8256, is at least 300 kJ/m², and then cooling the same again to room temperature.

2. A process as claimed in claim 1, wherein the polyethylene has a weight-average molar mass $M_w$ of from 200 to 800 kg/mol and a breadth of molar mass distribution $M_w/M_n$ of from 5 to 80.

3. A process as claimed in claim 1, wherein the blow molding is formed by extrusion blow molding.

* * * * *